United States Patent Office 3,295,574
Patented Jan. 3, 1967

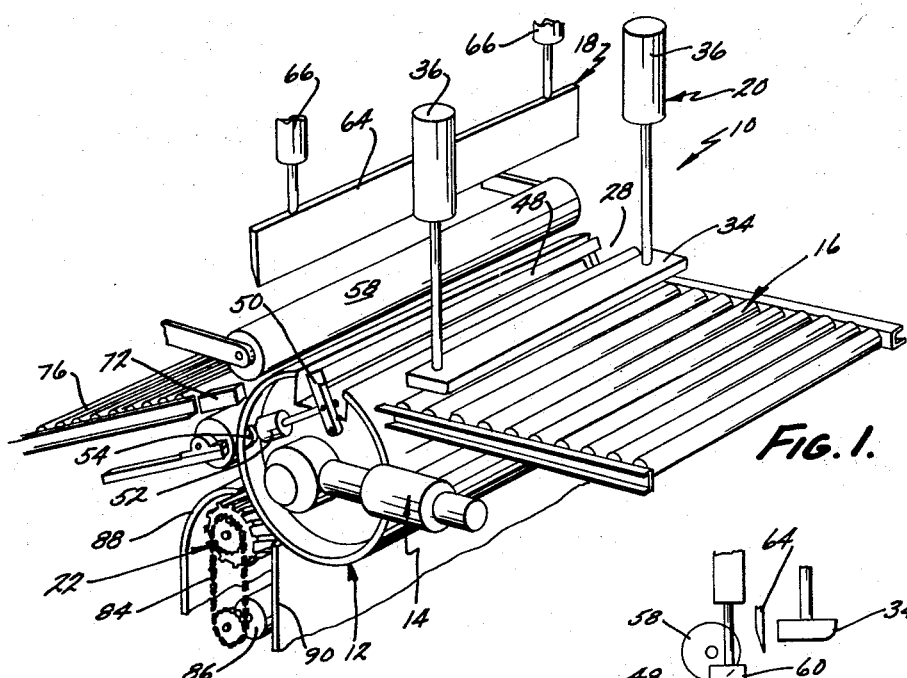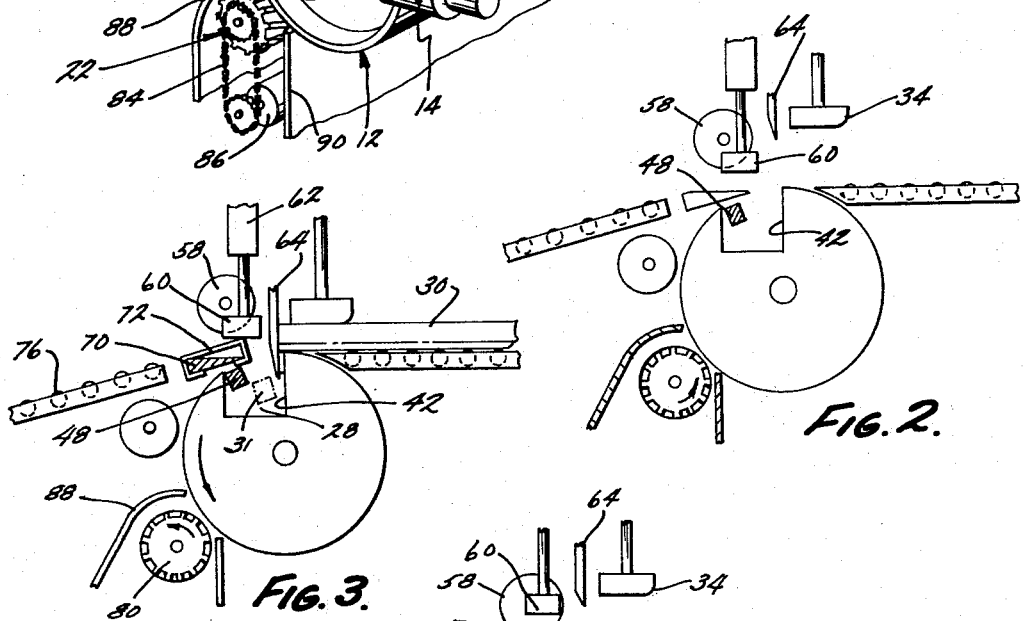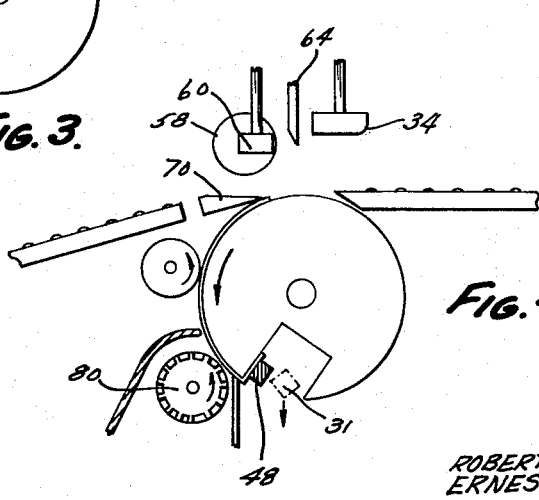

3,295,574
METHOD AND APPARATUS FOR SKINNING
Robert J. Broersma, Spring Lake, and Ernest M. Reimer, New Era, Mich., assignors to Wolverine Shoe & Tanning Corporation, Rockford, Mich., a corporation of Michigan
Filed Aug. 7, 1964, Ser. No. 388,211
6 Claims. (Cl. 146—241)

This invention relates to a drum-type, hogside skinning apparatus for separating the skin and meat of a hogside, and more particularly relates to a combination skinflap forming apparatus and drum-type skinning machine.

Since this apparatus is intended chiefly for separating the skin from the meat of hogsides, and since applicants and the assignee herein are chiefly interested in hogsides and the leather and meat products obtained therefrom, the novel apparatus and method will be described and explained with respect thereto for convenience. However, it should be understood that the concepts, structure, and method described could conceivably be adapted to skinning sides of other animals, within the broader aspects of this invention.

Conventionally, skinning of hogsides is conducted by gripping the edge of the hogside and pulling it past a skinning blade to slice the meat from the skin. The gripping is conventionally achieved either by a high powered clamp which grips tightly into the meat and skin on one edge, or alternatively, by sharp protuberances which puncture the skin and meat to pull the hogside past the skinning blade. Both methods damage the meat and/or skin, causing waste of one or both of these products along the edge of the hogside. Further, since the clamped skin and damaged meat remain on the side after it is skinned, the meat must be subsequently fleshed off and the skin edge must be severed from the remainder of the skin in subsequent operations which require added time, effort and expense.

It is therefore an object of this invention to provide a drum-type skinning apparatus that uniquely forms a gripping flap on the skin, prior to the actual skinning operation. The apparatus, furthermore, saves the valuable skin and meat on the hogside without damaging it.

It is another object of this invention to provide a drum-type skinning apparatus capable of preforming a skin flap for gripping, in such a manner that the flap is formed and positioned automatically within the drum clamp that pulls the hogside around the drum past the skinning blade. One jaw of the clamp actually cooperates with a shearing blade to help form the flap which is thus positioned automatically.

It is another object of this invention to provide a skinning apparatus enabling the skinning operation to be sequentially carried out with formation of the skin flap on the same drum-type apparatus. The flap is rapidly formed with one swipe of the skinning blade in cooperation with the pulling clamp.

Another object of this invention is to provide a drum-type skinning machine with a gripping flap former that creates the flap directly within the confines of the drum periphery and in the clamping jaws against one jaw of the clamp.

These and several other objects of this invention will become apparent upon studying the following specification in conjunction with the drawings in which:

FIG. 1 is a perspective view of the novel apparatus;

FIG. 2 is a side elevational, partially schematic view of the novel apparatus, just prior to operation;

FIG. 3 is a side elevational partially schematic view of the apparatus showing the first step of the operation; and FIG. 4 is a side elevational, partially schematic view of the apparatus showing the skinning operation.

Referring now specifically to the drawings, skinning machine 10 there illustrated preferably comprises a combination skinning and fleshing machine. The combination 10 includes as an essential element the rotationally mounted skinning drum assembly 12, its drive means 14, the feed-in support means 16, shearing unit 18, hogside hold down means 20, and flesher unit 22.

The drum assembly 12 includes a cylindrical elongated drum rotatably mounted on its central axis. The drum is rotatably driven by a suitable electric motor and gear box assembly 14 mounted adjacent one end of the drum. Alternatively, the drum may be driven by any chain and sprocket drive or other equivalent drive assembly. It is preferably indexed to rotate one revolution at a time, with the elongated axial ditch 28 in its periphery being upward when the drum is stopped.

Ditch 28 is substantially deep and wide so as to readily receive an edge of a hogside 30 fed to the unit on conveyor mechanism 16. Feed-in conveyor 16 is shown as a roller-type conveyor, but may be any of several different support means, preferably power driven, or slanted for gravity feed. The conveyor is tangential to the drum top periphery so that the hogside is fed in with its forward edge over the mouth of the open ditch.

In order to hold the hogside in the proper relationship on the conveyor when the operations are taking place, a hold down means 20 is provided. It is shown in simple form, comprising an elongated bar 34 operated by a pair of fluid cylinders 36.

Ditch 28 includes one side wall 42 substantially radial to the drum. The side wall has a generally flat planar surface extending the entire depth and width of the wall to form a guide surface and also a clamping surface. Mounted within the ditch is a second shiftable clamping jaw 48 extending axially of the ditch wthin its confines. The ends of the bar are mounted on a pair of arms 50 pivotally attached at their opposite ends to the drum. Operably associated with the clamp and arms is a pair of fluid cylinders 52 on opposite ends of the drum. The base of each fluid cylinder is pivotally mounted to the drum at mount 54, and the piston rod extending from the cylinder is pivotally mounted to the arm. Thus, by extension of these fluid cylinders, shiftable jaw 48 is moved into operative clamping relation toward clamping surface 42. Retraction of the cylinders places clamp 48 near the opposite side wall of the wide ditch or notch (FIG. 2).

Mounted above the drum, adjacent the ditch, is a retractable stop means 60 positioned part way over the ditch. Each hogside 30 introduced by the conveyor 16 abuts this stop means in initial stages of the operation to locate the hogside edge with respect to the ditch. Stop means 60 is retractable by suitable power means such as fluid cylinders 62.

Preferably, a guide roller 58 is also provided adjacent the drum near this assembly. The skin flap shearing device 18 includes an elongated, axially extending, vertically reciprocable, shearing blade 64. A pair of fluid cylinders 66 on opposite ends of the blade provide power shifting thereof. The shearing blade is mounted and aligned to reciprocate from the position above the periphery of the drum, down into ditch 28 closely spaced to wall 42 an amount substantially equal to the thickness of a hogside skin. The blade moves parallel to surface 42.

Mounted adjacent the periphery of the drum, axially thereof, is a skinning blade 70 spaced from the drum an amount equal to the hogside skin thickness. A pair of bracket means 72 supports the opposite ends of the blade.

This blade mount, shown in outline form, may be the type, for example, shown in U.S. patent application entitled Skinning Machine, filed March 4, 1964, Serial No. 349,254.

Immediately behind the skinning blade and aligned therewith is a meat take-off conveyor 76 which routes the severed meat to the next operation.

Preferably, a fleshing roll 80 is also mounted adjacent the drum periphery spaced from the skinning blade in the direction of drum rotation. Its purpose is to slice the remaining flesh off the skin after the meat slab has been severed by the skinning blade. This fleshing roll is a cylindrical, axially elongated, element parallel to the axis of rotation of the skinning drum, and rotatably mounted and driven. The fleshing roll includes a plurality of spaced blades on its periphery. These blades extend from both ends, diagonally towards the center of the roll. It is driven by suitable chain and sprocket means 84 or the equivalent, operated by an electric motor. Adjacent the fleshing roll are flesh retaining panels 88 and 90 to confine the severed flesh from the high speed roll.

*Operation*

During operation, clamp closing and drum rotation are initiated by palm switches or the like. The drum is preferably rotated one revolution at a time by gear and motor drive mechanism 14. This can be achieved by the use of conventional limit switches.

The hogsides are fed one at a time along the support area formed by conveyor 16, with the skin down. It is advanced on conveyor 16 until the forward edge of the hogside abuts lowered stop means 60. At this position, the edge of the hogside extends over the ditch and beyond surface 42. Subsequently, hold down clamp 34 is lowered by actuation of power cylinders 36 to overcome the natural curvature of the hogside and to secure it in one position. As the hogside is held and while clamp jaw 48 is still retracted open (FIG. 2) shearing blade 64 is lowered by actuation of power means 66. The blade moves down into ditch 28 at a spacing from wall 42 equal to the thickness of the skin thickness along the edge of the hogside. It forceably bends the edge of the hogside around the 90° corner and simultaneously severs off the end chunk of meat 31. The bent skin edge is pressed against planar surface 42 which acts as a stop and guide for regulation of the flap forming operation. Subsequently, stop means 60 and the shearing blade are retracted as illustrated in FIG. 4. Then clamp jaw 48 is shifted toward surface 42 into engagement with the formed skin flap. The drum then begins to rotate as indicated by the arrows in FIG. 3 and FIG. 4. It pulls the hogside past skinning blade 70 to sever the meat from the skin, with the meat passing over conveyor 76 and the skin moving with the clamp on the drum.

As the drum continues to rotate, it pulls the skin past the rotating, high speed, fleshing roll 80. As the ditch turns upside down, the chunk of edge meat 31 drops from the unit into a container (not shown).

After the skinning and fleshing operations are complete, clamp 48 opens to drop the skin into a suitable container (not shown), and continues its revolution until its 360° cycle has been made. At this stage, it is in position (FIG. 2) to receive the next hogside. Consequently, stop means 60 is again lowered as the next hogside is advanced to the mechanism.

Any suitable sequential control means, electrical, mechanical or pneumatic may be employed to cause the sequential operations of (1) stop lowering when the meat hogside is introduced, (2) hold down lowering, (3) shearing blade lowering, (4) stop means and shearing blade retraction, (5) hold down retraction, (6) clamp jaw actuation, (7) drum rotation, (8) clamp jaw release prior to full 360 degree drum rotation, and (9) stopping of the drum after one complete revolution.

During the skinning operation, the meat and skin on the edge of the hogside is not damaged. Further, no large "wedge" of flesh remains on the edge of the hogside when the skinning operation is complete. The preformed skin flap is in optimum condition for clamping.

Preferably, the entire skinning and fleshing operation is performed during one revolution of the drum.

It is conceivable that the details of this structure may be modified somewhat without departing from the concepts taught. For example, if it is desired to obtain a better grip on the skin flap, the gripping face of jaw 48 can be serrated or roughened. Also, surface 42 can have embedded therein a shiftable recessed jaw which moves out beyond the edge of the planar surface 42 to cooperate with jaw 48. Normally, the surface of face 42 should be smooth, however, for optimum guiding and cooperation with shearing blade 64. It is also conceivable that surface 42, instead of being oriented directly radial of the drum, could be at a slight angle, so as to be on a chord of the drum. Of course, the shearing blade would have to be introduced at the same angle during the shearing operation to remain parallel thereto. It is even conceivable that surface 42 could be slightly curved to cooperate with a correspondingly curved blade, although this is not preferred due to the ease of shearing with a completely flat or planar surface.

Since various minor modifications could be made within the inventive concept taught herein, this invention is not to be limited merely to the specific preferred form illustrated, but only by the scope of the appended claims and the reasonable equivalents thereto.

We claim:

1. Skinning apparatus comprising: a rotationally driven skinning drum; an elongated, axial ditch in the drum periphery including a planar surface extending axially of said drum; clamping means in said ditch; feed-in support means tangential to said drum and the mouth of said ditch; meat shearing means movable into said ditch parallel to, adjacent to, and spaced slightly from said surface to slice meat from a skin edge and simultaneously force the skin edge into said ditch against said surface adjacent said shearing means; and skinning blade means adjacent said drum.

2. Hogside skinning apparatus comprising: a rotational drum and adjacent skinning blade means; an elongated axial ditch in the periphery of said drum; shiftable skin clamping means in said ditch; a radial guide surface along one wall of said ditch; and a shiftable hogside bending and meat slicing edge mounted adjacent said drum and shiftable into said ditch in a path parallel to and spaced from said surface about the thickness of a hogskin, to simultaneously deflect the skin edge into said ditch for clamping and slice off the meat from said skin edge.

3. Skinning apparatus comprising: a rotationally mounted drum and rotational drive means therefor; an elongated ditch extending axially in the periphery of said drum, parallel to the rotational axis thereof; said ditch having a side wall forming both a holding surface and a clamping surface; a shiftable clamp jaw mounted to said drum in said ditch and movable toward and away from said surface to clamp a skin therebetween; a shearing element shiftable from a position spaced from the periphery of said drum, into said ditch at a spacing from said surface equal to an animal skin; feed-in guide means extending tangentially to said drum allowing a side to extend over said ditch to enable said shearing element to lop off a section of edge meat and deform a skin flap into said ditch for clamping; and skinning blade means adjacent said drum periphery to separate meat and skin when a side is pulled therepast by rotation of said drum by said clamped skin flap.

4. Skinning apparatus for hogsides comprising: a rotational drum and rotational drive means therefor; a skinning blade mounted adjacent said drum to slice meat from skin of a hogside when a clamped hogside is pulled past said blade by rotation of said drum; an elongated, axial, deep notch in the periphery of said drum; skin clamping means in said notch including a power operated, shiftable jaw and a fixed clamping surface; said surface being along one elongated side of said notch, generally radial of said drum, and generally planar; a support for feeding in hogsides to said drum, generally tangential to said drum and the mouth of said notch; retractable stop means adjacent said drum and said support area to position a hogside with an edge above said notch; shearing blade means mounted adjacent said drum, and shiftable into said notch spaced from said surface the thickness of the skin to deform the edge of the hogskin into said notch and slice off the meat therefrom; hold down means above said support area to hold the hogside during shearing; and take-off guide means to receive the severed meat.

5. Skinning apparatus for hogsides comprising: a rotational drum and rotational drive means therefor; a skinning blade mounted adjacent said drum to slice meat from skin of a hogside when a clamped hogside is pulled past said blade by rotation of said drum; an elongated, axial, deep notch in the periphery of said drum; skin clamping means in said notch including a power operated, shiftable jaw and a fixed clamping surface; said surface being along one elongated side of said notch, generally radial of said drum, and generally planar; a support for feeding in hogsides to said drum, generally tangential to said drum and the mouth of said notch; retractable stop means adjacent said drum and said support area to position a hogside with an edge above said notch; shearing blade means mounted adjacent said drum, and shiftable into said notch spaced from said surface the thickness of the skin to deform the edge of the hogskin into said notch and slice off the meat therefrom; hold down means above said support area to hold the hogside during shearing; and take-off guide means to receive the severed meat; and powered rotational, fleshing roll means adjacent said drum, spaced from said skinning blade in the direction of rotation of said drum to remove residual fleshy material from said skin.

6. A method of skinning hogsides on a notched rotational skinning drum, comprising the steps of: placing a hogside, skin down, tangentially of the drum, with its edge overlapping the drum notch; lowering a shearing blade against an edge portion of the hogside at an angle of at least about 90° with respect to the edge portion for simultaneously severing the meat from the edge of the skin and bending the skin edge into the notch; clamping the skin edge in the notch, and rotating the drum past a skinning blade.

References Cited by the Examiner

UNITED STATES PATENTS

| | | | |
|---|---|---|---|
| 1,291,173 | 1/1919 | Salmon | 146—130 |
| 1,418,104 | 5/1922 | Spiselman. | |
| 2,285,951 | 6/1942 | Hooydonk | 146—130 |
| 2,292,319 | 8/1942 | Dziedzic et al. | 146—130 |
| 2,649,881 | 8/1953 | Runnells et al. | 146—130 |
| 2,989,105 | 6/1961 | Burch | 146—130 |

WILLIAM W. DYER, JR., *Primary Examiner.*

J. M. MEISTER, *Assistant Examiner.*